Aug. 29, 1950  G. A. TRAUGER  2,520,229
MACHINE FOR BREAKING UP SURFACE MATERIAL
Filed March 3, 1949  3 Sheets-Sheet 2

Witness
Merle A. Bjork

Inventor
Guy A. Trauger
by M. Talbert Dick
Attorney

Aug. 29, 1950   G. A. TRAUGER   2,520,229
MACHINE FOR BREAKING UP SURFACE MATERIAL
Filed March 3, 1949   3 Sheets-Sheet 3

Witness
Merle A. Bjork

Inventor
Guy A. Trauger
by M. Talbert Dick
Attorney

Patented Aug. 29, 1950

2,520,229

UNITED STATES PATENT OFFICE 2,520,229

MACHINE FOR BREAKING UP SURFACE MATERIAL

Guy A. Trauger, Livermore, Iowa

Application March 3, 1949, Serial No. 79,471

5 Claims. (Cl. 262—14)

The principal object of my invention is to provide a machine that will successfully and easily break up objectionable surface material such as ice, plant growth and like.

A further object of this invention is to provide an ice or snow breaking machine that may be successfully used in the cleaning of streets, pavements and roadways without damage to the same.

A still further object of my invention is to provide a road or field conditioning machine that may be attached to or built as a unit with a self-propelled vehicle.

A still further object of this invention is to provide a surface ice or like breaker that is easily assembled or disassembled.

A still further object of my invention is to provide a surface material breaking machine that is under the full control of the operator at all times.

A still further object of this invention is to provide a surface material breaker that is economical in manufacture and durable in use.

These and other objects will be apparent to those skilled in the art.

My invention consists in the construction, arrangement, and combination of the various parts of the device, whereby the objects contemplated are attained as hereinafter more fully set forth, pointed out in my claims, and illustrated in the accompanying drawings, in which:

While my machine may be used successfully for breaking up cornstalks, or even cutting plant life, it is especially designated for the breaking up of ice and packed snow on streets and highways. The removal of ice, sleet and packed snow from roadways and especially paved roads and streets has become a major problem. This material becomes so hard that at times workmen with picks can not easily break it up so that it can be removed from the street. Such hand methods of breaking up ice is however slow and costly and in the case of highways is entirely impractical. Most machines hereberefore designed for breaking up the ice on streets and highways have been undesirable from the standpoint of damage to the street or highway. I have overcome such problems by providing a controllable machine that will safely break up all adhering ice, sleet and snow with dispatch.

Figure 1:
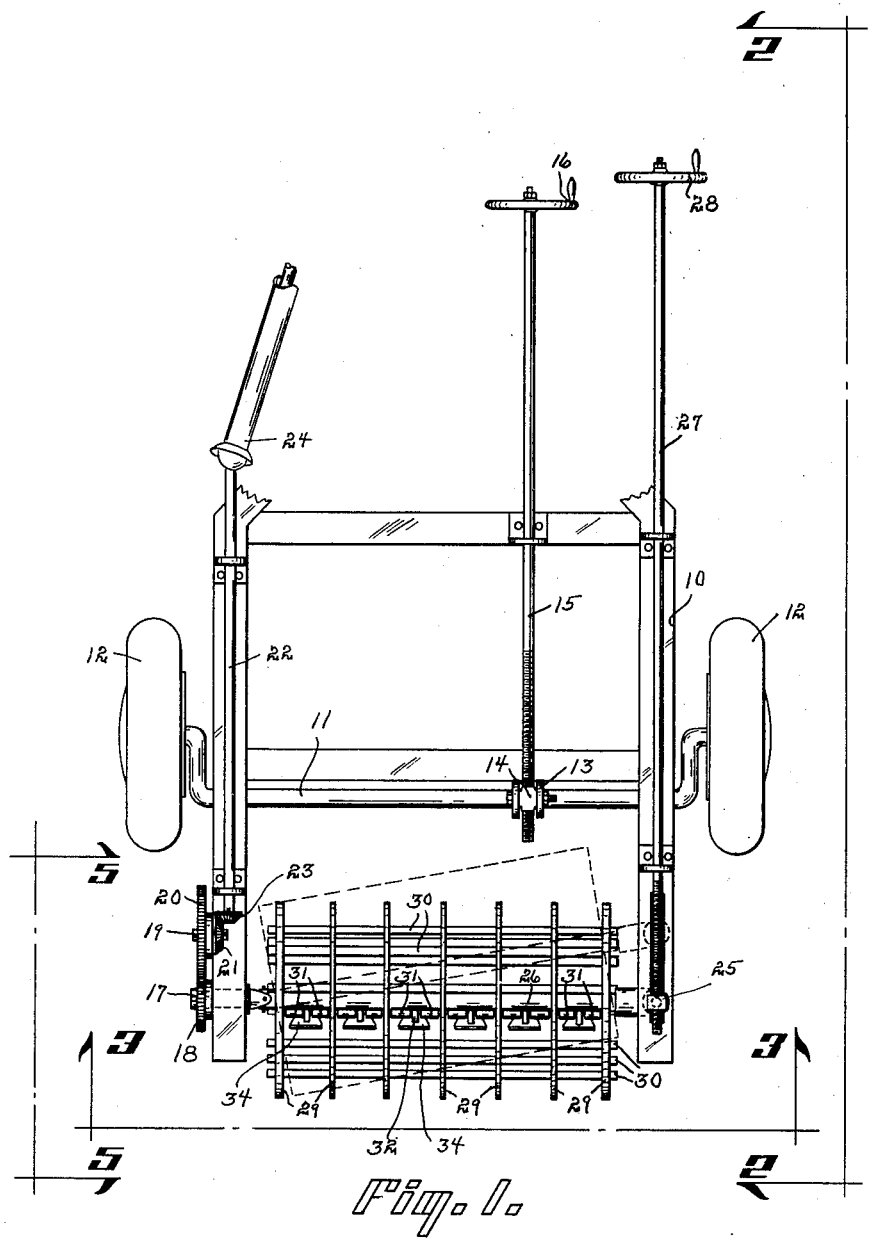
Fig. 1 is a top plan view of my invention ready for use.
Figure 2:
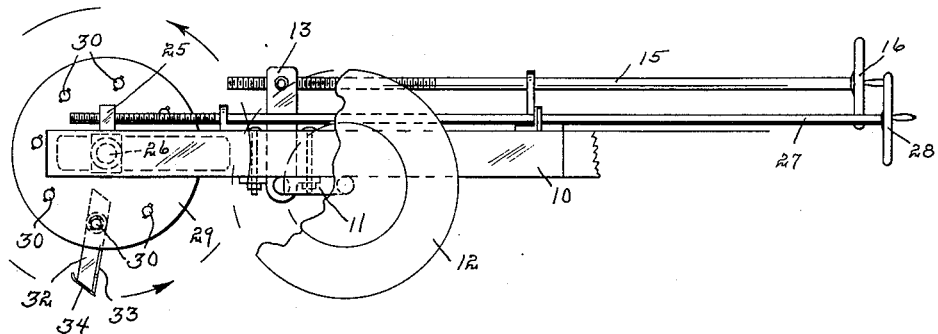
Fig. 2 is a side view of the device taken from line 2—2 of Fig. 1.
Figure 3:
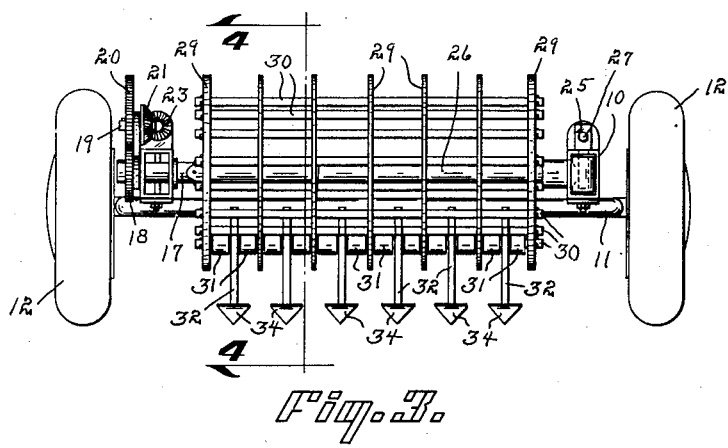
Fig. 3 is a rear end view of my machine.

Referring to the drawings I have used the numeral 10 to designate the fixed frame portion of my machine. The numeral 11 designates a U-shaped crank axle rotatably secured to the under side of a frame. Rotatably mounted on each end of the axle is a wheel 12. The numeral 13 designates a link element having its lower end rigidly mounted around the center portion of the axle. The numeral 14 designates a bearing member pivoted to the top of the link element. The numeral 15 designates a shaft rotatably secured on the frame, but not slidably mounted thereon, having its rear end threaded through the bearing member 14, as shown in Fig. 2. The numeral 16 designates a wheel or crank means on the forward end of the shaft 15 to facilitate the manual rotation of the shaft. By this arrangement the rotation of the shaft to right or left will move the upper end of the link means forwardly or rearwardly thereby rotating the axle and lowering or raising the frame 10 relative to the supporting wheels. The numeral 17 designates a stub shaft rotatably mounted in the left rear end portion of the frame 10, as shown in Fig. 1. The numeral 18 designates a spur gear secured on the stub shaft. The numeral 19 designates a shaft rotatably mounted on the rear left end of the frame 10 and carrying a spur gear 20 having its teeth in mesh with the teeth of the spur gear 18. The numeral 21 designates a bevel gear on the shaft 19. The numeral 22 designates a shaft rotatably mounted on the frame 10 having on its rear end a bevel gear 23, the teeth of which are in mesh with the teeth of the bevel gear 21. The numeral 24 designates a universal joint connected to the forward end of the shaft 22 and is designed to be connected to a prime mover or the power takeoff or like of a motorized vehicle, such as a tractor. The numeral 25 designates a bearing member longitudinally slidably mounted on the right rear end of the frame 10. The numeral 26 designates a shaft having one end slidably and rotatably extending into the bearing member 25 and its other end pivoted to the stub shaft 17 as shown in Fig. 1. The numeral 27 designates a shaft rotatably, but not slidably mounted on the frame 10 having its rear end portion threaded through the bearing member 25. The numeral 28 designates a wheel or crank means on the forward end of the shaft 27 to facilitate its manual rotation. By this construction when the shaft 27 is rotated in one direction, the bearing member 25 will be moved forwardly carrying the right end of the shaft 26 forwardly, and when it is rotated in the opposite direction the bearing member 25 will carry the right end of the shaft 26 rearwardly. This action adjustably changes the angle of the shaft 26 relative to the longitudinal axis of the frame 10 as shown by dotted lines in Fig. 1. When the shaft 22 is rotated the shaft 26 will be rotated regardless of its position relative to the frame 10. This hereinbefore described construction of lowering and raising the frame and changing the angle of the shaft 26 relative to the direction of movement of the frame or vehicle is standard practice and I lay no claims to the same when used independently of my breaking and chopping mechanism, which I will now describe.

In fact, this portion of my machine just described is one form of construction and other, and perhaps equally efficient supporting and control means, may be devised to handle my breaking and chopping mechanism. It is, however, important that some means be used to lower and raise my mechanism and also to give it adjustment as to its angle of attack.

Figure 4:
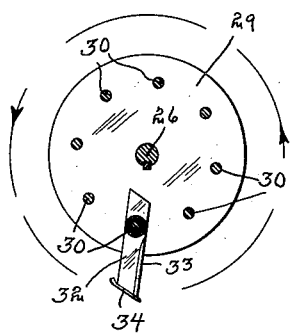
Fig. 4 is a cross-sectional view of the machine taken on line 4—4 of Fig. 3.
Figure 5:
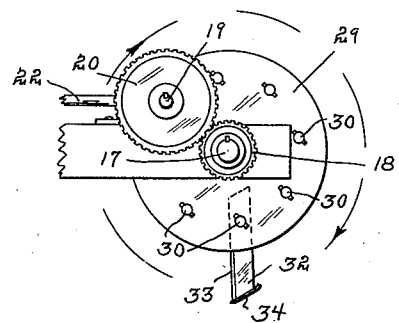
Fig. 5 is a side view of a portion of the machine taken from line 5—5 of Fig. 1.
Figure 6:
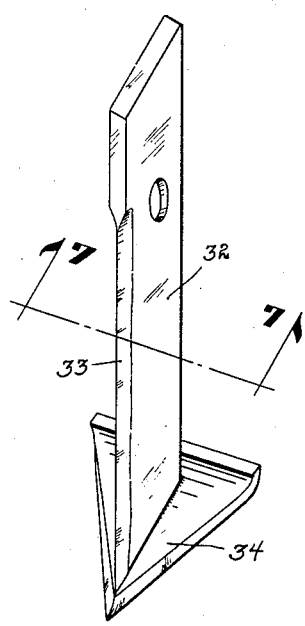
Fig. 6 is an enlarged perspective view of one of the cutting and breaking arm hammers.
Figure 7:
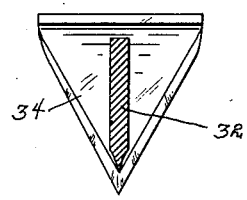
Fig. 7 is a cross-sectional view of one of the arm hammers taken on line 7—7 of Fig. 6.

My mechanism first comprises a plurality of spaced apart discs 29 on a shaft 26. The numeral 30 designates a plurality of rod shafts evenly spaced apart and extending through all of the discs 30. These rod shafts form a cylinder cage and are each placed near the periphery of the discs, as shown in Fig. 4. On at least one rod shaft 30 and between each disc are two spacing rings 31 and rotatably mounted on the rod shaft and between each of the pairs of spacing discs is a cutting and chipping arm hammer generally designated by the numeral 32. Each of these hammer arms are pivoted on the rod shaft near their inner ends and obviously one exists between any two of the discs 29. While in the drawings I have shown only one rod shaft carrying these arm hammers, it is recommended that at least two or more of the rods have such arm hammers and that such rods carrying the hammer arms be equally spaced apart so that they will counter-balance each other. The arms are made from bar metal, rectangular in cross-section, and each has its leading edge 33 sharpened, as shown in Fig. 6. On the outer end of each arm is a pointed triangular-shaped blade or foot 34. The pointed end of each of these blades is adjacent the leading edge 33 of the arm to which it is secured and has its two rearwardly and outwardly extending side edges sharpened, as shown in Fig. 7. Obviously, the leading edge of the arm and the pointed end of the blade extend toward the direction of rotation of the cylindrical cage of the device, and as shown in Fig. 4 and Fig. 5. The position of the blade relative to the longitudinal axis of its arm is forwardly and downwardly, as shown in Fig. 6. The rear side end portion of each of the blades is slightly curved rearwardly and upwardly. By this construction when the shaft 22 is rotating, the cage of the device will be rotating and the hammer arms will be yieldingly held outwardly therefrom by centrifugal force. When attacking surface material such as ice, the first impact will be by the point of the blade below and slightly forward of the vertical plane of the shaft 26. As the cylinder cage continues its rotation, however, the blade will first straighten out parallel with the roadway or like surface, and then will change its altitude whereby the blade point will extend rearwardly and upwardly with the bottom or curved butt trailing edge of the blade contacting the material to be broken up. This change of angle of attack of the blade as it passes over the ice or like to be broken up is most important. It not only avoids damage to the street or roadway, but first chips the ice or like, moves the same to either side of the blade and then tends to raise the ice or like from the surface. Once the arm hammer has passed by the surface, it will be carried around with the cage to strike another blow. By a rod shaft spaced apart from and at each side of the hammer arms, their rotation on their own rod shaft will be limited. The adjustment of the bearing member 25 by the crank 28 will permit the cage cylinder to rotate at an angle to the direction of travel of the vehicle if desired. This encourages the throwing of the material to the rear and to the side of the path of attack. The proper operating height of the cylinder cage is important and is adjustable by the crank 16. If the shaft 11 is split and a double adjustable control is used, one side of the cylinder cage may be lowered or raised relative to the other side, or any other suitable means to accomplish this may be employed. The presence of the discs 29 are important. Besides spacing the hammer arms, these discs may act as wheels, if and when unbreakable objects are encountered, by merely riding over the objects and raising the device accordingly. In use the sharpened leading edges of the arms act as knives in cutting the material being attacked. If desired, a safety shield may be placed over the rotating cage and arm hammers. The discs 29 may be rigidly secured on the shaft 26 by any suitable means. The cylinder cage may be caused to rotate in either direction relative to the direction of travel over the surface, but the arms 32 and blades 34 must always travel in the direction of their pointed or sharpened edges.

Some changes may be made in the construction and arrangement of my machine for breaking up surface material without departing from the real spirit and purpose of my invention, and it is my intention to cover by my claims, any modified forms of structure or use of mechanical equivalents which may be reasonably included within their scope.

I claim:

1. In a hammer arm, a bar portion designed to be hingedly mounted at its inner end, a pointed triangular foot blade secured to the outer end of said bar and extending outwardly and forwardly relative to the longitudinal length of said bar, and a rearwardly and inwardly curved heel portion on the trailing edge portion of said blade.

2. In a hammer arm, a bar portion designed to be hingedly mounted at its inner end; said bar having its leading edge sharpened, a pointed triangular foot blade secured to the outer end of said bar and extending outwardly and forwardly relative to the longitudinal length of said bar, and a rearwardly and inwardly curved heel portion on the trailing edge portion of said blade.

3. In a surface material breaking machine, a frame, a shaft rotatably mounted in said frame, a plurality of spaced apart discs fixed to said shaft, a plurality of rods extending through said discs and fixed thereto to form a cylindrical cage, a plurality of arms each hingedly secured to at least one of said rods, a single arm mounted between each two discs on any one of said rods, a foot blade mounted on one end of each of said arms, and a means for rotating said shaft.

4. In a hammer arm, a bar designed to be hingedly mounted at one end, a foot blade secured to the other end of said bar; said foot blade being flat for a majority of its length and curving upwardly at its rear end; the longitudinal axis of said flat portion forming an obtuse angle with the longitudinal axis of said arm.

5. In a hammer arm designed to be used on a machine having a rotating cage, an arm member designed to be rotatably mounted by one of its ends on said cage, and a foot blade secured to the other end of said arm; said foot blade having a flat portion and curved portion and with the arm secured solely to the flat portion; the top plane of said flat portion forming an obtuse angle with the longitudinal axis of said arm.

GUY A. TRAUGER.

REFERENCES CITED

The following references are of record in the file of this patent:

UNITED STATES PATENTS

| Number | Name | Date |
| --- | --- | --- |
| 106,195 | Newsom | Aug. 9, 1879 |
| 431,919 | Rogers | July 8, 1890 |
| 1,076,241 | Schwahn | Oct. 21, 1913 |
| 1,628,101 | Baldwin | May 10, 1927 |
| 2,279,922 | Krauer | Apr. 14, 1942 |